No. 634,040. Patented Oct. 3, 1899.
D. STRANGE.
INTEREST MEASURE.
(Application filed July 9, 1898.)
(No Model.)
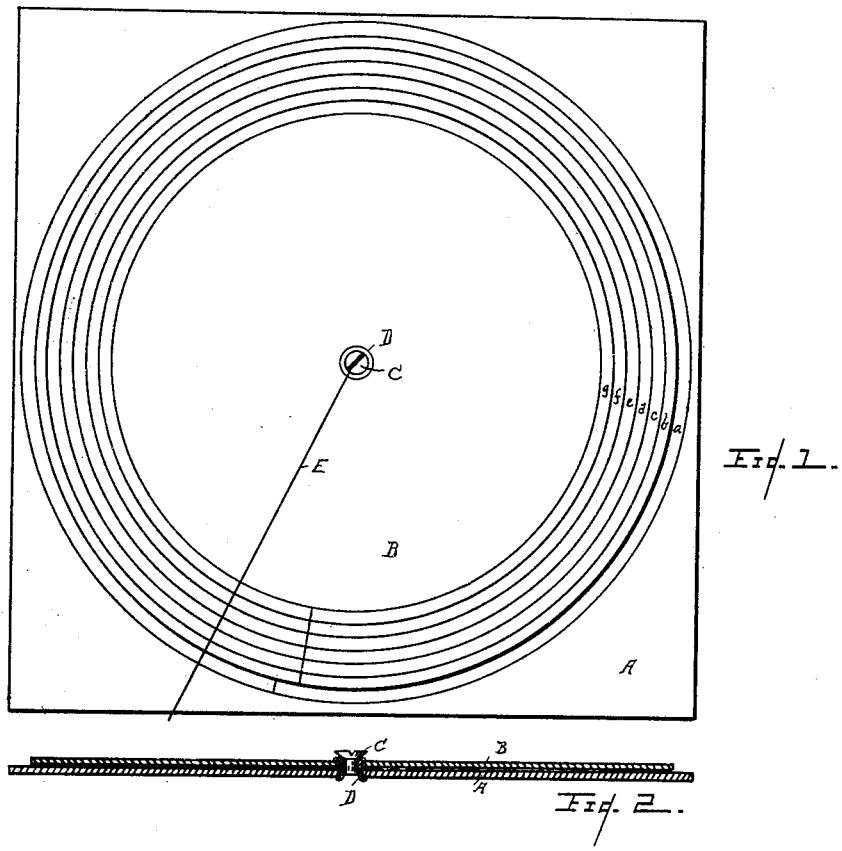
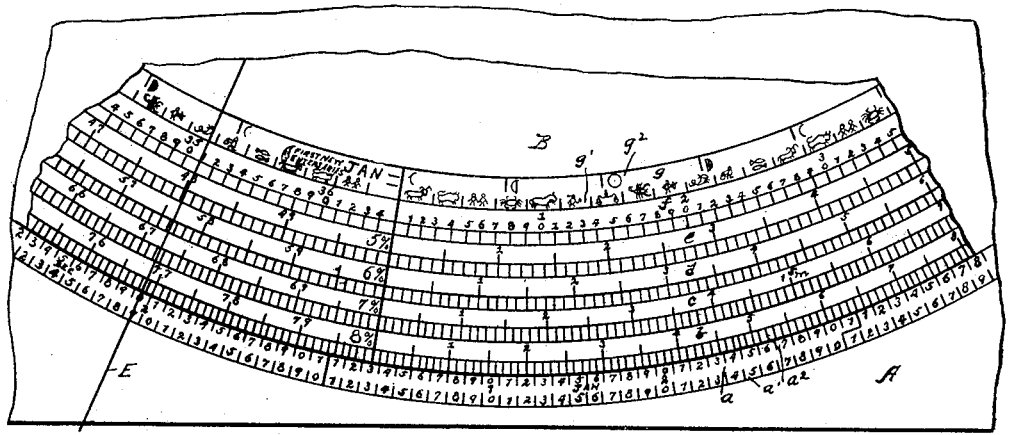
WITNESSES. INVENTOR.
Daniel Strange
THE NORRIS PETERS CO., PHOTO-LITHO., WASHINGTON, D. C.

UNITED STATES PATENT OFFICE.

DANIEL STRANGE, OF LANSING, MICHIGAN.

INTEREST-MEASURE.

SPECIFICATION forming part of Letters Patent No. 634,040, dated October 3, 1899.

Application filed July 9, 1898. Serial No. 685,568. (No model.)

*To all whom it may concern:*

Be it known that I, DANIEL STRANGE, a citizen of the United States, residing at the city of Lansing, county of Ingham, and State of Michigan, have invented certain new and useful Improvements in Interest-Measures, of which the following is a specification.

This invention relates to improvements in interest-measures and lunar indicators.

It has for its object a simplification of interest measures and indicators, whereby the amount of interest is indicated on the scale in units of measure for given rates, so that any amount of interest can be determined for any period at any rate very quickly and with great accuracy.

I accomplish the object of my invention by the devices and means illustrated in the accompanying drawings, in which—

Figure 1 is a diagrammatic plan view, much reduced in size, of my improved interest-measure. Fig. 2 is a transverse sectional elevation of the structure appearing in Fig. 1. Fig. 3 is an enlarged detail view of a portion of the structure appearing in Fig. 1.

Referring to the lettered parts of the drawings, A is a suitable base on which is supported a disk B, which is preferably pivoted at its center by an eyelet D or screw C.

On the bottom plate A is a circular scale $a$, of which the pivot referred to is the center, and just within this circular scale is a border of the circular disk B, which is provided with a series of concentric scales $b\ c\ d\ e\ f\ g$.

The scale on the base A is provided with two sets of numbers and is in reality two distinct scales. The outer scale $a'$ is graduated in three hundred and sixty equal spaces of the circle with dates giving thirty days to each of the twelve equal months to measure interest as it is usually computed. The scale $a''$ is divided into three hundred and sixty-five equal portions representing the days of a year, and the months are measured by the actual number of days in each month. The divisions between the months are plainly marked and their dates shown; but owing to the crowded space the tens in each group in naming the dates are printed but once for tens or twenties. The inner scales $b\ c\ d\ e\ f$ are marked to indicate units for different rates of measuring interest. The outer scale $b$ is intended to measure interest at eight per cent. The base or principle for measuring the interest is taken at one hundred dollars. This would make the interest for a single year eight dollars or eight hundred cents. The circle is therefore divided into eight hundred equal spaces, and it must be clear therefore that the length of time required for the one hundred dollars to earn one cent at the rate of eight per cent. would be the one eight-hundredth part of a year, and by applying this scale it is easy to determine the interest by turning the zero-point of the scale B to the date of the note for one hundred dollars at eight per cent. and reading the amount on the scale opposite the date on which the amount became due. As this is indicated in units on the scale, it becomes a very easy matter to read the amount of interest at eight per cent. on a hundred dollars for any given period. This saves the awkward computation of time and interest, and the simplest multiplication after the amount on one hundred dollars is given fixes the amount for any sum differing therefrom. Following this same theory the circular scale $c$ is divided into seven hundred equal parts to figure interest at seven per cent. The circular scale $d$ is divided into six hundred equal parts and the scale $e$ is divided into five hundred equal parts for the purpose of computing interest for the respective rates at six or five per cent. Each space of the scale therefore represents the amount of time that it takes one hundred dollars to earn one cent interest at the different rates which the various circular scales are designed to measure.

Secured to the pivot at the center is a thread or wire E, which can be drawn straight out over the edge of the scale and held in place by the finger or clamped by any suitable means. In practical use the index thread or wire E will be secured over the edge of the scale marking the day of the month, and all interest due on that date will be read at this point. To compute the interest, the scale B will be turned so that its zero-point is opposite the date on which the note is given. The interest is then read as I have indicated, and any computation necessary to secure a different amount than the interest on one hundred dollars is made. Where the interest is on a thousand dollars, the decimal point in each computation is merely moved one place to the right.

To demonstrate the use, I call attention to the fact that in the drawings the indicator is set at December 20, true time, which changes to correspond to December 19, interest time. The disk B is rotated so its zero-point comes at the middle of the date of the note or instrument drawing interest. In the drawings it is January 3. The index-line shows that the interest on one hundred dollars at eight per cent. since January 3 is seven dollars and sixty-eight cents just before noon on December 20, true time, and soon after noon it is seven dollars and sixty-nine cents. At seven per cent. it is six dollars and seventy-two cents, at six per cent. it is five dollars and seventy-six cents, and at five per cent. it is four dollars and eighty cents. The outer circle $a'$ shows that by banker's rule of twelve months, thirty days each, he takes upon December 19 exactly what really is earned on December 20.

The circle $f$ is divided into three hundred and sixty-five spaces representing days, and by reading on this circle it will be noted that the period that had elapsed is exactly three hundred and fifty-one days.

In the marking of my improved scale I have placed the numbers indicating units within the circular spaces and have marked the tens or hundreds only once at the beginning of each group and a little above the same. This facilitates the numbering and makes the scale more easily readable in a small size. I find that the size of this scale should be about fifteen (15) inches in diameter to secure satisfactory results.

On the circle $g$ is a lunar indicator which has graduations for showing the moon's place and phases. I make no claim here for this device and therefore will not describe it in detail.

I desire to state in this connection that the circular scale may be detached and applied for the purpose of measuring the interest; but it will of course be preferred to have the same permanently retained in position by a pivot or otherwise.

I desire to state that this plan of a scale measuring units of value in connection with the scale indicating the time that has elapsed is valuable for use in rectilinear scales, though of course it will not always be found so convenient as in the circular form.

Having thus described my invention, what I claim as new, and desire to secure by Letters Patent, is—

In an interest-measure the combination of a base A, bearing a double annular scale with divisions corresponding to the actual days of the year and the others corresponding to the interest year of three hundred and sixty days; a movable circular plate for use in connection therewith having scales corresponding to different rates of interest, each scale being divided according to the length of time it would take a fixed sum to earn a unit of value so that by the applying of the one scale to the other the amount of interest earned can be measured therefrom without computation.

DANIEL STRANGE.

In presence of—
  WALTER C. WINTER,
  FRANK WINTER.